United States Patent [19]

Sherman

[11] Patent Number: 4,637,162
[45] Date of Patent: Jan. 20, 1987

[54] TAMPER-PROOF RODENT BAIT STATION

[76] Inventor: Daniel A. Sherman, 1355 Bobolink Pl., Los Angeles, Calif. 90069

[21] Appl. No.: 824,881

[22] Filed: Jan. 31, 1986

[51] Int. Cl.$^4$ ............................................. A01M 1/20
[52] U.S. Cl. ...................................................... 43/131
[58] Field of Search .................. 43/124, 131; 220/306, 220/307

[56] References Cited

U.S. PATENT DOCUMENTS

| | | | |
|---|---|---|---|
| 2,811,768 | 11/1957 | Axelson | 220/306 |
| 2,880,262 | 3/1959 | Bell et al. | 220/307 |
| 3,999,677 | 12/1976 | Oberkincher | 220/306 |
| 4,349,982 | 9/1982 | Sherman | 43/131 |
| 4,364,194 | 12/1982 | Clark | 43/131 |
| 4,453,337 | 6/1984 | Williams | 43/131 |
| 4,541,198 | 9/1985 | Sherman | 43/131 |

Primary Examiner—M. Jordan

[57] ABSTRACT

This invention relates to rodent bait stations and more specifically to the use of an improved method of closure that will insure ease of acess by authorized personnel but will prevent the unit from being readily opened by those unfamiliar with its operation. The invention utilizes a system of independent flexible tabs, limited by restricting plates, to form an integrated structure of base and top and to seal the unit securely together.

1 Claim, 7 Drawing Figures

TAMPER-PROOF RODENT BAIT STATION

BACKGROUND OF THE INVENTION

During the past few years tremendious strides have been made in providing both profession and private applicators of rodenticide products with safe methods for housing these substances.

Now, for the first time, rodent erradication can be carried out utilizing poisons in devices that totally isolate them from potential cntamination of the surrounding environment, while providing ready access to the target species.

Some of the prior art devices which have been developed to contain and deliver these powerful poisoned baits are characterized by U.S. Pat. Nos. 1,561,440 11/1925 Hanson ... 43/131, 2,480,724 8/1949 Feussner ... 43/131, 2,568,168 9/1951 Query ... 43/131, 2,628,089 1/1953 Osfar ... 222/561, 2,690, 029 9/1954 Mullen ... 43/131, 2,725,664 12/1955 Mullen 43/131, 3,352,053 11/1967 Anderson 43/131, 4,026,064 5/1977 Baker 43/131, 4,349,982 9/1982 Sherman 43/131, 4,541,198 9/1985 Sherman 43/131, 4,400,904 8/1983 Baker 43/131 and Foreign Pat. No. 648419 1/1937 Federal Republic of Germany 43/131.

Although these inventions advanced the state of the art in the containment of poisoned baits they failed to take into consideration the ease of operation needed to make the products a viable method of large scale use in everyday operations by providing security along with a method of closure and reopening that would conform to the materials used in todays technology for the fabrication of "tamper-proof" rodent bait stations.

An object of the present invention is to provide a method of ease of closure and reopening of the "tamper-proof" containers that will allow them to last longer and will insure their secure seal in day to day operations for many years.

Specifically, this invention improves on the SHERMAN U.S. Pat. No. 4,541,198 by providing a locking mechanism that will survive continous usage and still allow the fabrication of the "tamper-proof" baiter of various materials in high volume production.

Still another object of the instant invention is to provide a flexible locking device that has restricted movement, even under significant force, in order to prevent the compromise of the locking device.

With the introduction of poisoned baits to the general public, it becomes even more necessary to provide a fool proof method of security to prevent accidental exposure to these baits from children, pets, and wildlife.

The instant invention significantly improves on the prior art by developing a closure that will withstand constant usage and allow the public the opportunity of safely using baits for long term rodent control and, conforms to the technologies of materials the could possibly be compromised in constant use.

These and other object, advantages and novel features of the invention will become apparent from the following description of the invention when considered in conjunction with the accompanying drawings.

BRIEF DESCRIPTION OF THE DRAWINGS

FIG. 7 shows the rear clip being moved forward thereby freeing the back edge of the cover and allowing it to be freely lifted. In this partial cross section the relationship between the restrictor plate is demonstrated and it can be seen that the rear tray clip can only be moved the distance necessary to clear it from the cooperating holes in the cover. This limit provides a positive means of insuring that the clip will not be damaged or forced into a position that will not allow it to spring back for future operation of the structures seal.

DETAILED DESCRIPTION OF THE PREFERRED EMBODIMENT

Figure 1:
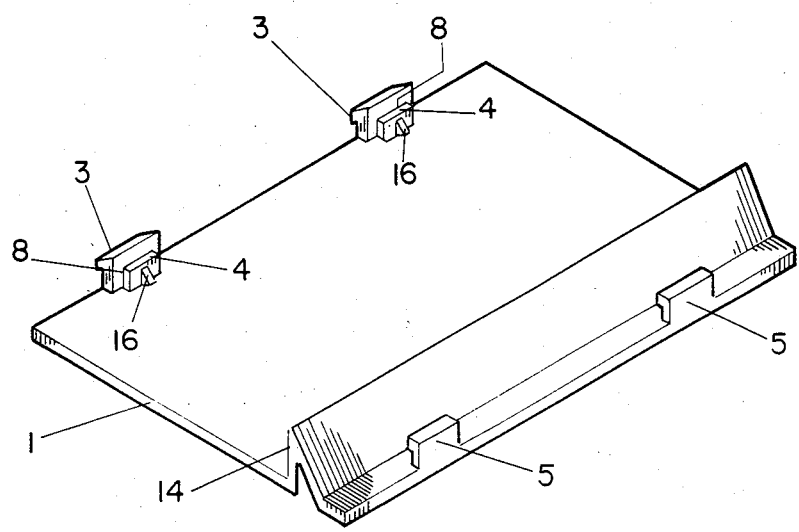
FIG. 1 is a drawing of the bait stations tray dipicting the detail of the locking clips at the rear of the tray, the restricting plate that directly opposes and limits the locking clips, the geometric design of the front portion of the tray that provides the leverage that pushes the cover tabs forward and finally the front tabs that provide a reseptical for the cover tabs and seals the unit.

As can be seen in FIG. 1 the bottom tray of the bait station is formed generally as 1 and has as integral member components a flexible rear latch 3 and a solid reinforced restricting plate 4 that is stabilized by a reinforcing tab at the front of the plate 16. The front of the tray 1 has a geometrical shape 14 that cooperates with the cover member 2 and also contains a forward lip with latches 5.

Figure 2:
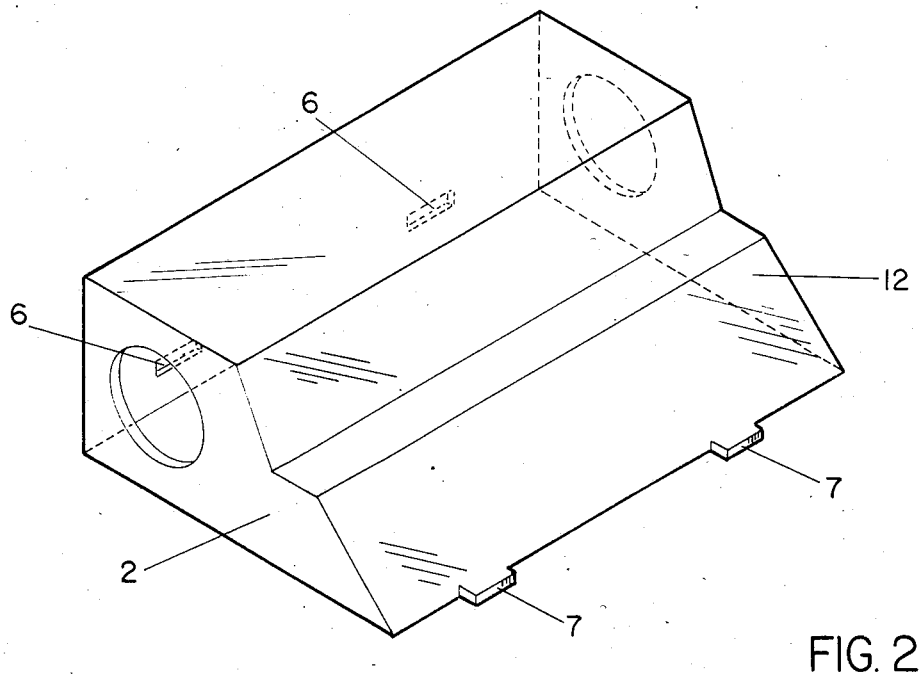
FIG. 2 is a perspective of the cover that demonstrates the rear locking holes which cooperate with the tray clips to seal the unit and the front cover tabs that cooperate with the base tabs to provide the initial seal. Also demonstrated is the geometric shape of the leading endge of the front of the cover which matches that of the geometric design on the base and provides, in cooperation with said base a forward movement of the cover that pushes the cover tabs securely into the locking tabs on the base to form a seal between the cover and base.

FIG. 2, the top of the unit is noted as number 2 generally and contains a sloped front 12 that act as the cooperating lever with the tray slope 14 forcing the front tabs on the cover portion 7 under the trays forward lip latches 5. The cover member 2 also contains slots 6 on its rear wall that will engage the tray 1 rear flexible latches 3 as the cover is forced down and over them.

Figure 3:
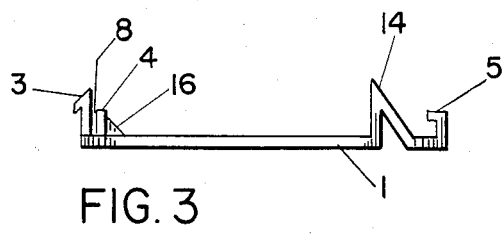
FIG. 3 is a side view of the base demonstrating a perspective of the relationships between the various mechanisms contained therein.

FIG. 3 demonstrates in profile the relationship between the components of the tray 1 and shows clearly the relationship between its rear flexible latch 3, which has been separated from the reinforced restricting plate 4 by a measured space 8 that allows the rear latch to move only a metered distance and insures that it will not be pushed in excess of its capability to spring back to a locked position and engage the cover slots 6. Also depicted in the profile of the sloped geometrical portion 14 and its relationship with the front forward lip latch 5.

Figure 4:
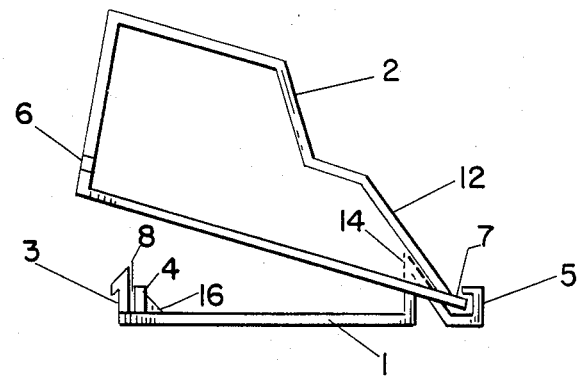
FIG. 4 is a side view of the top and base showing the relationship of the units as they are being joined together and demonstrating the leveraging action of the covers leading edge as it is placed into position for closure against the base member.

In FIG. 4 we see the covers front tabs 7 being slid under the trays forward lip latches 5 and the leverage that is caused as the covers leading sloped edge 12 leans against the trays geometrical slope 14 causing 7 to be wedged under 5.

Figure 5:
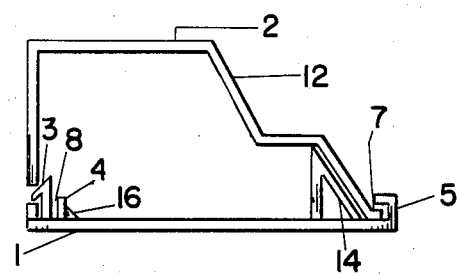
FIG. 5 show the completed closure and the relationship of the members of the base and cover.

FIG. 5 shows the completed seal with the trays rear flexible latches having gripped the covers rear slots 6.

Figure 6:
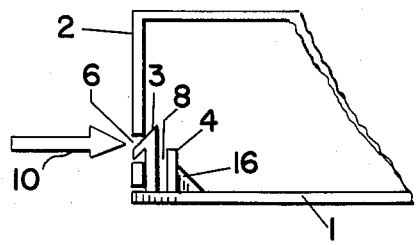

FIG. 6 demonstrates the method of opening the rear seal of the cover 2 and the tray 1 by pushing against the trays flexible rear tab 6 in a direction indicated as 10 in the drawing. Also indicated is the distance 8 that will allow the tab 3 to disengage from the slot 6 and yet travel only a metered distance designated as 8.

Figure 7:
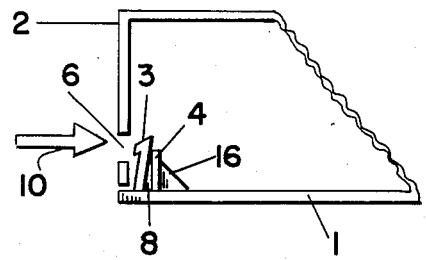
FIG. 7 is a partial detail of the rear of the top and bottom and demonstrates the clip action of the bases rear locking clip and its cooperation with the covers rear holes. Also demonstrated is the forward action needed to free the edge of the tray clip to open the seal of the unit.

In FIG. 7 we actually see the release of the cover member 2 from the seal created by the flexible clip 3 and that the clip 3 has only been allowed to procede forward the distance 8 and has been held in check by the restricting plate 4 which has been further reinforced by the tab 16.

What I claim is:

1. A tamper-proof rodent bait station consisting of a top and base member, the top member having an animal entrance hole on each of two sides and having a plurality of locking tabs and slots that cooperate to form a tamper-proof seal between the top and base; said base being constructed with upwardly extending independent barbed tabs that face outwardly and that are capable of being flexed backwards to release the cover member from the base member, with said base member also containing a reinforced restricting plate located directly behind said flexible tabs and positioned a metered distance from the independent tabs to allow only that movement necessary to release the tab from the slot, releasing the cover member.

* * * * *